(12) United States Patent
Lohr et al.

(10) Patent No.: US 10,074,475 B2
(45) Date of Patent: Sep. 11, 2018

(54) INDUCTION CHARGING COIL DEVICE

(71) Applicant: Robert Bosch GmbH, Stuttgart (DE)

(72) Inventors: Guenter Lohr, Leinfelden-Echterdingen (DE); Dragan Krupezevic, Stuttgart (DE); Juergen Mack, Goeppingen (DE); Marcin Rejman, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 316 days.

(21) Appl. No.: 14/654,315

(22) PCT Filed: Dec. 18, 2013

(86) PCT No.: PCT/EP2013/077150
§ 371 (c)(1),
(2) Date: Jun. 19, 2015

(87) PCT Pub. No.: WO2014/096040
PCT Pub. Date: Jun. 26, 2014

(65) Prior Publication Data
US 2015/0348696 A1 Dec. 3, 2015

(30) Foreign Application Priority Data

Dec. 21, 2012 (DE) .......... 10 2012 112 859
Dec. 21, 2012 (DE) .......... 10 2012 112 944
Dec. 17, 2013 (DE) .......... 10 2013 226 226

(51) Int. Cl.
*H01F 27/36* (2006.01)
*H01F 38/12* (2006.01)
(Continued)

(52) U.S. Cl.
CPC ....... *H01F 27/288* (2013.01); *H01F 27/2804* (2013.01); *H01F 27/362* (2013.01);
(Continued)

(58) Field of Classification Search
USPC .................. 336/84 R, 84 C, 84 M; 320/108
See application file for complete search history.

(56) References Cited

U.S. PATENT DOCUMENTS

| | | | | |
|---|---|---|---|---|
| 5,327,065 A | * | 7/1994 | Bruni | ........... H02J 7/025 |
| | | | | 320/108 |
| 2005/0189910 A1 | * | 9/2005 | Hui | ........... H01F 17/0006 |
| | | | | 320/108 |

(Continued)

FOREIGN PATENT DOCUMENTS

| CN | 101345327 A | 1/2009 |
|---|---|---|
| CN | 102362563 A | 2/2012 |

(Continued)

OTHER PUBLICATIONS

International Search Report for PCT/EP2013/077150, dated May 13, 2014.

*Primary Examiner* — Elvin G Enad
*Assistant Examiner* — Kazi Hossain
(74) *Attorney, Agent, or Firm* — Norton Rose Fulbright US LLP; Gerard Messina

(57) ABSTRACT

An induction charging coil device is provided, in particular an induction charging coil device for a hand-held power tool, including at least one coil unit having at least one shielding unit, at least one core unit and at least one electronics unit and/or one cell unit to be shielded. It is provided that a projection area of the core unit, in the case of a projection in the direction of a winding axis of the coil unit, covers at least essentially the electronics unit and/or the cell unit to be shielded.

13 Claims, 6 Drawing Sheets

(51) Int. Cl.
  *H01F 27/28* (2006.01)
  *H02J 50/70* (2016.01)
  *H02J 50/10* (2016.01)
  *H01F 38/14* (2006.01)
  *H02J 7/02* (2016.01)
  *H01M 10/44* (2006.01)
  *H02J 5/00* (2016.01)

(52) U.S. Cl.
  CPC ........... *H01F 27/365* (2013.01); *H01F 38/14* (2013.01); *H01M 10/44* (2013.01); *H02J 7/025* (2013.01); *H02J 50/10* (2016.02); *H02J 50/70* (2016.02); *H02J 5/005* (2013.01)

(56) References Cited

U.S. PATENT DOCUMENTS

| | | | | |
|---|---|---|---|---|
| 2009/0015362 A1* | 1/2009 | Okada | ............... | H01F 27/2871 336/65 |
| 2009/0121677 A1* | 5/2009 | Inoue | ............... | H02J 7/025 320/108 |
| 2010/0081483 A1 | 4/2010 | Chatterjee et al. | | |
| 2010/0176811 A1* | 7/2010 | Tsuda | ............... | G01R 33/422 324/318 |
| 2011/0210696 A1 | 9/2011 | Inoue | | |
| 2011/0234155 A1 | 9/2011 | Chen et al. | | |
| 2012/0206229 A1* | 8/2012 | Casper | ............... | F27D 11/00 336/90 |
| 2013/0069756 A1* | 3/2013 | Wolf | ............... | H01F 17/04 336/221 |
| 2013/0314199 A1* | 11/2013 | Yamashita | ............ | H01F 27/365 336/84 M |
| 2015/0303735 A1* | 10/2015 | Kari | ............... | H01F 38/14 320/108 |

FOREIGN PATENT DOCUMENTS

| | | | |
|---|---|---|---|
| CN | 102651499 A | | 8/2012 |
| EP | 2015424 | | 1/2009 |
| JP | 02014011852 A | * | 6/2012 |
| KR | 20100125268 | * | 8/2012 |
| KR | 101209979 B1 | | 12/2012 |
| TW | 200740076 A | | 10/2007 |
| WO | WO2011/032803 | | 3/2011 |
| WO | WO2012/147341 | | 11/2012 |

\* cited by examiner

INDUCTION CHARGING COIL DEVICE

BACKGROUND INFORMATION

Induction charging coil devices, in particular hand-held power tool induction charging coil devices, including at least one coil unit, including at least one shielding unit, including at least one core unit and including at least one electronics unit to be shielded and/or a cell unit are presently known.

SUMMARY

The present invention is directed to an induction charging coil device, in particular a hand-held power tool induction charging coil device, including at least one coil unit, including at least one shielding unit, including at least one core unit and including at least one electronics unit to be shielded and/or a cell unit.

It is provided that a projection area of the core unit, in the case of a projection in the direction of a winding axis of the coil unit, covers at least essentially the electronics unit to be shielded and/or the cell unit. A "coil unit" in this context is intended to mean, in particular, a unit which has at least one conductor loop, including at least one winding formed by a conductor. The coil unit is provided for transmitting and/or preferably receiving electrical energy in at least one operating state. The coil unit preferably has a winding support. The winding support may be provided, in particular, to support the at least one conductor loop. The coil unit is preferably provided to feed received energy to a consumer and/or a cell unit of a rechargeable battery, in particular via a voltage transformer and/or charging electronics. Alternatively, the induction charging coil device may be provided to transmit energy to an additional induction charging coil device. The coil unit is preferably provided to convert an electric alternating current into an electromagnetic alternating field and/or vice versa. The alternating field preferably has a frequency of 10 kHz-500 kHz, particularly preferably of 100 kHz-120 kHz. A "hand-held power tool induction charging coil device" in this context is intended to mean, in particular, an induction charging coil device of a hand-held power tool, of a hand-held power tool rechargeable battery pack or a hand-held power tool rechargeable battery charging device. A "hand-held power tool" in this context is intended to mean, in particular, an electrical device hand-operated by a user, such as, in particular, a power drill, a drill hammer, a saw, a plane, a screwdriver, a milling tool, a grinder, an angle grinder and/or a multi-functional tool or a garden tool, such as a hedge trimmer, shrub and/or grass shears. A "shielding unit" in this context is intended to mean, in particular, a device, which is provided to reduce a field strength of the electromagnetic alternating field in the area of the electronics unit to be shielded and/or the cell unit, propagating in the direction from the coil unit to the electronics unit to be shielded and/or the cell unit. The field strength of the electromagnetic alternating field is preferably reduced by at least 50%, particularly preferably by at least 80%. A "core unit" in this context is intended to mean, in particular, a device, which is provided to focus an electromagnetic alternating field. In particular, the core unit may be formed at least partially from a magnetic material. A "magnetic material" in this context is intended to mean preferably a ferromagnetic, in particular magnetically soft, material. Alternatively, it is also conceivable to use ferromagnetic and/or antiferromagnetic materials. The core unit may be formed from a ceramic magnetic material. The core unit may include a carrier material, in particular a binding agent. The carrier material may, in particular, be provided to support the magnetic material. An "electronics unit" in this context is intended to mean, in particular, a device, which includes at least one electric and/or electronic component. The electronics unit may advantageously include charging electronics of the hand-held power tool rechargeable battery pack and/or of the hand-held power tool rechargeable battery charging device. In particular, the electronics unit may include a printed circuit board. A "printed circuit board" in this context is intended to mean, in particular, a flat component, which is provided to support and to contact electric and/or electronic components. The printed circuit board preferably includes at least one electrically insulating carrier layer and at least one conductive layer adhering to the carrier layer. It is also possible for multiple conductive layers, which are separated by insulation layers, to be situated on one side of the carrier layer. A "cell unit" in this context is intended to mean, in particular, an energy storage unit, which has at least one rechargeable battery cell, which is provided, in particular, for an electrochemical storage of electrical energy. The rechargeable battery cell may be a lead rechargeable battery cell, a NiCd-rechargeable battery cell, a NiMH-rechargeable battery cell, in particular, however, a lithium-based rechargeable battery cell. Other types of rechargeable battery cells known to those skilled in the art are also conceivable. A "winding axis" in this context is intended to mean, in particular, an axis which extends on average through a center of the windings of the conductor loops of the at least one coil unit of the induction charging coil device. A "projection area" in this context is intended to mean, in particular, an area of a shadow casting of a body in the case of a parallel projection in the projection direction. "Cover at least essentially" in this context is intended to mean, in particular, that the projection area of the core unit in the projection direction covers an outer contour of the electronics unit and/or the cell unit, preferably the electronics unit and the cell unit, by at least 90%, preferably by more than 95%, particularly preferably by at least 100%. The core unit may advantageously focus the electromagnetic alternating field, so that only reduced field strengths occur in the area of the electronics unit and/or the cell unit.

The shielding unit may be advantageously formed at least partially by the core unit. An electromagnetic alternating field propagating in the direction from the coil unit to the electronics unit and/or the cell unit during an operation of the induction charging coil device may be advantageously focused by the core unit in the direction of the coil unit. Energy contained in the electromagnetic alternating field may be at least partially absorbed by the coil unit and strengthen an electric current. A field strength of the electromagnetic alternating field on the side facing the electronics unit and/or the cell unit of the core unit may be reduced by at least 50%, particularly preferably by at least 80%. The electronics unit to be shielded and/or the cell unit may be protected from the electromagnetic alternating field. An influence of the electromagnetic alternating field on the electronics unit and/or the cell unit may be reduced. Leakage currents caused in the electronics unit and/or the cell unit by the electromagnetic alternating field may be reduced. Heating of the electronics unit and/or the cell unit by leakage currents may be reduced. Damage to the electronics unit and/or the cell unit and/or a reduced service life of the electronics unit and/or the cell unit and/or a malfunction of the electronics unit and/or the cell unit due to influences of the electromagnetic alternating field on the electronics unit and/or the cell unit may be avoided. A degree of efficiency of the induction charging coil device may be increased.

It is further provided that the projection area of the core unit is at least essentially free of recesses. "At least essentially" in this context is intended to mean that a total area of recesses of the projection area is less than 10%, preferably less than 5%, particularly preferably less than 1% of a total area of the projection area. The core unit may advantageously cover the conductor loops of the coil unit at least essentially free of recesses. The core unit particularly preferably covers at least the conductor loops of the coil unit free of recesses. The core unit is able to particularly effectively shield the electromagnetic alternating field.

It is also provided that the shielding unit is formed at least partially by at least one electrically conductive material layer. The electrically conductive material layer is able, in particular, to shield the electromagnetic field by reflecting and retroreflecting the field. The electronics unit and/or the cell unit to be shielded may be protected from the electromagnetic field. An influence of the electromagnetic field on the electronics unit and/or the cell unit may be reduced. Leakage currents in the electronics unit and/or the cell unit caused by the electromagnetic alternating field may be reduced. Heating of the electronics unit and/or the cell unit by leakage currents may be reduced. Damage to the electronics unit and/or the cell unit and/or a reduced service life of the electronics unit and/or the cell unit and/or a malfunction of the electronics unit and/or the cell unit as a result of influences of the electromagnetic field on the electronics unit and/or the cell unit may be avoided. A degree of efficiency of the induction charging coil device may be increased. The electrically conductive material layer may be formed, in particular, by a copper material and/or aluminum material. A "copper material and/or aluminum material" in this context is intended to mean, in particular, a material made up of predominantly copper and/or aluminum. A copper material and/or aluminum material may form a particularly efficient conducting material layer. In particular, the copper material and/or aluminum material may be applied to a carrier layer in a coating process, preferably in an electro-plating process. The material layer may be particularly durably connected to the carrier layer. The material layer may be particularly thin. In particular, the material layer may be thinner than 0.5 mm, preferably thinner than 0.1 mm. The material layer may be particularly light and/or cost-effective. The material layer may be advantageously formed by a conductive layer of a printed circuit board. In an alternative embodiment of the present invention, the material layer may be formed by an imprinted and/or varnished layer. In particular, the material layer may be formed by an electrically conductive varnish. The electrically conductive varnish may, in particular, contain electrically conductive particles, such as graphite particles or metal particles. The material layer may be particularly easily applied to the carrier layer. The shielding unit may include the electrically conductive material layer and the core unit. The shielding unit may be particularly effective.

It is further provided that the at least one electrically conductive material layer has a projection area which, in the case of a projection in the direction of a winding axis of the coil unit, covers at least essentially the electronics unit and/or the cell unit to be shielded. The electrically conductive material layer is able to particularly effectively shield the electronics unit and/or the cell unit to be shielded from the electromagnetic alternating field.

Alternatively and/or in addition, an electrically conductive material layer is provided, which has a projection area which, in the case of a projection in the direction of the winding axis of the coil unit, is situated at least essentially within a projection area of the core unit. In particular, an outer margin of the projection area of the electrically conductive material layer relative to the winding axis may have a spacing smaller by 1 mm-10 mm, preferably 2 mm-5 mm, particularly preferably 2.5 mm-3.5 mm than an inner margin of the projection area of the core unit relative to the winding axis. The electrically conductive material layer is able to effectively shield the electromagnetic alternating field in a space within the windings of the coil unit. A field strength of the electromagnetic alternating field may be particularly high in an area of an outer edge of the core unit. The electrically conductive material may be situated outside this area having a particularly high field strength. An electric potential induced by the electromagnetic alternating field in the electrically conductive material may be reduced, and a high quality is achieved nevertheless. An influence of the electromagnetic alternating field on components conductively connected to the electrically conductive material layer may be minimal.

It is further provided that the shielding unit has a plurality of electrically conductive material layers separated from one another by insulators in a projection area in the direction of a winding axis of the coil unit. The material layers may, in particular, be situated within the projection area of the windings. An "insulator" in this context is intended to mean, in particular, an electrically insulating material and/or a spacing. The material layers may have different electric potentials. Components may be preferably electrically conductively connected to the material layers. Components connected to one of the material layers may, in particular, have a shared electric potential in the area of the connection. It may be possible to prevent different electric potentials of the components from being equalized by a connection to a shared electrically conductive material layer.

It is further provided that at least one electrically conductive material layer is situated on a rear side of the electronics unit. A "rear side" in this context is intended to mean, in particular, a side of the electronics unit facing away from a component side. A "component side" in this context is intended to mean, in particular, a side of the electronics unit on which at least a plurality of electronic and/or electric components of the electronics unit is situated. The at least one electrically conductive material layer may, in particular, be formed by a conductive layer of the printed circuit board of the electronics unit facing toward the coil unit. The at least one electrically conductive material layer may preferably have a projection area in the direction of the winding axis, the projection area lying within the projection area of the windings of the coil unit. The printed circuit board may preferably have multiple material layers separated by insulators within the projection area of the windings. The material layers may have different electric potentials. Each of the material layers may preferably be connected to one or multiple components, in particular electric and/or electronic components, of the electronics unit, in particular with the aid of connecting wires guided through the printed circuit board. The connecting wires may be preferably soldered to the material layers. The connections of components to a material layer preferably have the same electric potential. The connections are preferably formed at least mainly by a material having good thermal conductivity, in particular a metal. Heat generated in the electric and/or electronic components during operation of the induction charging coil device may be transferred to the material layer and/or radiated from the material layer. The material layer may form a cooling body of the components connected to the material layer. Components having different electric material may be connected to different material layers separated by insulators. It may be possible to prevent the different potentials of the components from being equalized.

It is further provided that the projection area of the core unit and/or of at least one electrically conductive material layer, in the case of a projection in the direction of the winding axis, corresponds at least essentially to a projection area of the electronics unit and/or the cell unit to be shielded in the case of a projection in the direction of the winding axis. "At least essentially" in this context is intended to mean, in particular, a deviation of less than 20%, preferably less than 10%, particularly preferably less than 5%. The core unit and/or at least one electrically conductive material layer may be particularly compact. It may be possible to prevent the core unit and/or the electrically conductive material layer from projecting beyond the electronics unit and/or the cell unit perpendicular to the winding axis. The projection area of the core unit may be particularly well coordinated with the electronics unit and/or the cell unit.

It is further provided that the core unit and/or at least one electrically conductive material layer have/has an at least partially pot-shaped design. "Pot-shaped" in this context is intended to mean, in particular, a shape having a depression, the depression preferably extending about the winding axis of the coil unit in the direction of the coil unit. The core unit and/or at least one electrically conductive material is able to shield the electronics unit and/or the cell unit situated on the side of the core unit facing away from the coil unit particularly effectively from the magnetic alternating field striking the core unit during operation of the induction charging coil device.

The core unit and/or at least one electrically conductive material particularly preferably surround(s) at least partially the electronics unit and/or the cell unit to be shielded. Preferably at least 30%, particular preferably at least 50%, of the electronics unit and/or the cell unit, preferably the electronics unit and the cell unit, are situated in the area of the core unit having the pot-shaped design. The shielding of the electronics unit and/or the cell unit from the magnetic alternating field impacting the core unit and/or at least one electrically conductive material layer during operation of the induction charging coil device may be further improved.

It is further provided that the core unit is formed at least partially by core elements embedded in a binding agent. A "core element" in this context is intended to mean, in particular, components of the core unit, which are at least essentially responsible for the magnetic properties of the core unit. The core elements are preferably formed at least mainly from the magnetic material, in particular from a sintered ferrite material. The core elements are advantageously formed by at least 70%, preferably by 80%, particularly preferably by at least 90% from a manganese zinc (MnZn) sintered material and/or a nickel-zinc (NiZn) sintered material. The core elements may be preferably cast in a binding agent formed as casting resin, in particular an epoxy resin. The core unit may be advantageously manufactured in a casting process. Alternatively, the binding agent may contain linear polymerizing monomeric building blocks and/or oligomeric building blocks of a thermoplast, such as lactame and/or cyclical butylene terephthalate oligomers. The binding agent may surround the core elements and polymerize them to form a polymer, such as, in particular, a polyamide. This process may occur more rapidly than a curing of an epoxy resin. A manufacture and/or a curing of the core unit may be carried out within a particularly short period of time. The core unit may be particularly robust. Together with the core elements, the binding agent may form a particularly break-resistant unit, in particular a break resistance may be higher than in the case of a core unit, which is formed from a sintered component. Alternatively, the core elements may be coated, i.e., covered over, with a binding agent in the form of a varnish. The core elements may adhere to one another. It may require a particularly small amount of binding agent. Cavities between the core elements may remain at least partially open. The core unit may have a particularly low mass. The core unit may be particularly cost-effective. Alternatively, it is provided that the core unit is made up of a ceramic, in particular ferromagnetic, material, as a result of which a particularly high degree of efficiency during an energy transfer may be advantageously achieved. In particular, leakages resulting from eddy currents may be minimized. A "ceramic" material is intended, in particular, to mean an inorganic polycrystalline material, which has been manufactured by a sintering process. In this case, the core unit preferably has at least two core elements movable relative to one another, as is described, for example, in DE 10 2011 083 003 A1. During a forming of a housing, the core elements are preferably movable nondestructively relative to one another. The phrase "movable relative to one another" is intended, in particular, to mean that one position of the one core element is displaceable nondestructively relative to a position of the other core element by a distance, which in the case of an integral core unit destructs this position. The core elements are preferably movable relative to one another by more than 0.1 mm, advantageously by more than 0.4 mm, particularly advantageously by more than 1 mm. A "core element" is intended, in particular, to mean an integral area of the core unit, which is advantageously made of a homogeneous material. The core unit preferably includes at least three, particularly preferably at least four, core elements. A core element may be formed from a sintered component. The core unit has, in particular, at least one separating element, which is provided for arranging the core segments spaced apart from one another, making a core unit possible which is effective and yet well protected against destruction. A "separating element" is intended, in particular, to mean an element, which in at least one operating state generates a force on at least one of the core elements, which counteracts a convergence of the core elements toward one another. The separating element is preferably situated between the at least two core elements. This means, in particular, that the separating element is situated on a straight line, which intersects at least two different, adjacent core elements. The separating element preferably has an adhesive layer, a foamed material and/or another material appearing useful to those skilled in the art. The separating element is particularly preferably designed as a plastic layer.

In one particularly advantageous embodiment of the present invention, it is provided that the core unit includes areas having a differing core material composition. A "core material composition" in this context is intended, in particular, to mean a chemical and/or physical composition of core materials forming an area of the core unit. In particular, the core material composition may be determined by a ratio of core elements and binding agents. The core material composition may be particularly well coordinated to different requirements within the core unit. The core material composition may, in particular, be particularly well suited for focusing a magnetic field in areas which have a high field strength during an operation of the coil unit. The core material composition may preferably be particularly break-resistant in areas having a high mechanical load, such as in the area of support means, which are provided for supporting the core unit. Preferably, the core unit may be particularly cost-effective in areas having no specific requirements. Those skilled in the art may optimally select the core material composition, in particular, with respect to functional as well as material costs. The core material composition may be advantageously selected in such a way that a relative permeability μ of the core unit is greater than 200, at least in the subareas of the core material facing toward the conductor loops of the coil unit. In subareas of the coil unit facing away from the conductor loops of the coil unit and/or which are furthest away from the conductor loops, the relative permeability μ may be smaller than 20. The core unit may be particularly efficient and/or durable and/or cost-effective. A quantity of magnetic material necessary for manufacturing the core unit may be reduced.

A contacting unit is also provided, which is guided through a recess of the core unit and/or the electronics unit. A "contacting unit" in this context is preferably intended to mean a device which is provided for a releasable contacting of the coil unit. The contacting unit may, in particular, be designed as a plug connection having two plug connection elements. The plug connection may preferably include a plug and a coupling. Other designs of the contacting unit are, however, also conceivable, in particular feed lines, which establish a contact with the aid of a solder connection. One of the plug connection elements, preferably the plug, may preferably be securely connected to the coil unit. The plug connection element may preferably be soldered to the coil unit. The other plug connection element may preferably be connected, preferably soldered, to the electronics unit. The other plug connection element may preferably be designed as a coupling. The plug connection elements may preferably be situated in large part within the recesses of the core unit and/or the electronics unit in an assembled state of the induction charging coil device, in which the contacting unit connects the coil unit to the electronics unit. "In large part" in this context is intended to mean more than 50%, preferably more than 60%, particularly preferably more than 80% of an outer volume of the plug connection. The induction charging coil device may be particularly compact. In particular, the induction charging coil device may be particularly thin in a thickness direction in the direction of a winding axis. A particularly space-saving accommodation of the induction charging coil device is possible. A device which includes the induction charging coil device may be particularly compact. An assembly of the induction charging coil device may be particularly simple. In particular, the contacting unit may form the contact between the coil unit and the electronics unit when the coil unit is joined in one assembly motion to the core unit and the electronics unit.

A housing unit is also provided, into which the core unit is cast and/or to which the core unit is molded. The housing unit may, in particular, contain the induction charging coil device. The core unit may be particularly effectively connected to the housing unit. The core unit may be particularly well protected by the housing unit. A break in the core unit may be prevented. The coil unit may be particularly advantageously cast into the core unit. Core unit, coil unit and housing unit may form a particularly robust assembly. The induction charging coil device may be particularly long-lasting.

A hand-held power tool device having an induction charging coil device with the described features is also provided. The hand-held power tool device in this case may be formed by a hand-held power tool, a hand-held power tool rechargeable battery pack, a hand-held power tool box or a hand-held power tool rechargeable battery charging device. The hand-held power tool device may have the aforementioned advantages of the induction charging coil device.

DETAILED DESCRIPTION

Figure 1:
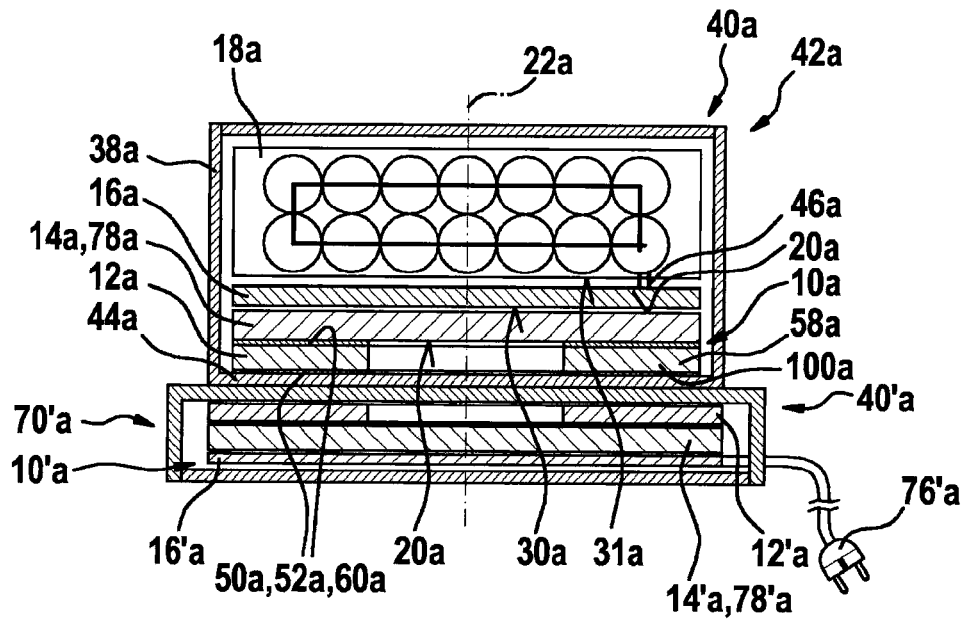
FIG. 1 schematically shows a sectional representation through a hand-held power tool rechargeable battery pack including an induction charging coil device, and a hand-held power tool rechargeable battery charging device including an additional induction charging coil device, FIG. 2 schematically shows a sectional representation of the induction charging coil device including a contacting unit, FIG. 3 schematically shows in a second exemplary embodiment a sectional representation through a hand-held power tool rechargeable battery pack including an induction charging coil device, FIG. 4 schematically shows in a third exemplary embodiment a sectional representation through a core unit and a coil unit of an induction charging coil device, FIG. 5 schematically shows in a fourth exemplary embodiment a representation of a part of a housing unit including an induction charging coil device, FIG. 6 schematically shows in a fifth exemplary embodiment a sectional representation through a hand-held power tool rechargeable battery pack and a hand-held power tool rechargeable battery charging device including an induction charging coil device, FIG. 7 schematically shows a representation of a printed circuit board forming the coil unit of the induction charging coil device, FIG. 8 schematically shows in a sixth exemplary embodiment a sectional representation through a hand-held power tool rechargeable battery pack and a hand-held power tool rechargeable battery charging device including an induction charging coil device, FIG. 9 schematically shows in a seventh exemplary embodiment a sectional representation through a coil unit of an induction charging coil device, FIG. 10 schematically shows in an eighth exemplary embodiment a representation of a coil unit including a shielding unit, and FIG. 11 schematically shows in a ninth exemplary embodiment a representation of a coil unit including a shielding unit.
Figure 2:
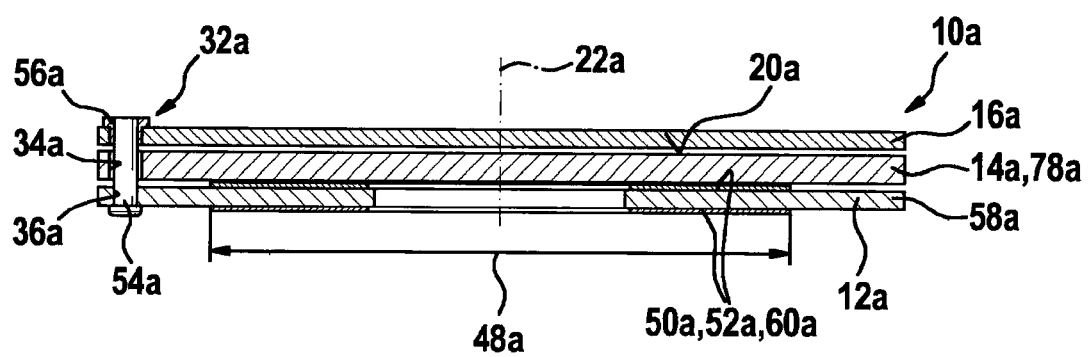

FIG. 1 shows a hand-held power tool device 40a including an induction charging coil device 10a. Hand-held power tool device 40a is designed as a hand-held power tool rechargeable battery pack 42a. Situated in a housing unit 38a is a cell unit 18a, which is provided for supplying energy to a hand-held power tool. Induction charging coil device 10a is provided for a wireless energy transfer for a charging operation of cell unit 18a. Induction charging coil device 10a is situated between cell unit 18a and a housing wall 44a of housing unit 38a. Following from housing wall 44a in the direction of cell unit 18a are, first of all, a coil unit 12a, a core unit 14a and an electronics unit 16a. Core unit 14a is formed from a ceramic material. Alternatively, core unit 14a may have core elements embedded in a binding agent or core elements moveably supported relative to one another. Electronics unit 16a is connected to cell unit 18a by a connecting lead 46a and includes charging electronics. Induction charging coil device 10a, including coil unit 12a, core unit 14a and electronics unit 16a, has a square base area. A square printed circuit board 58a having conductive layers 60a on both sides forms coil unit 12a. Coil unit 12a includes two conductor loops 50a having spiral windings 52a with identical winding directions about a winding axis 22a. Conductor loops 50a are formed by printed conductors of conductive layers 60a situated on both sides of a carrier layer 100a of printed circuit board 58a. Carrier layer 100a thus forms a winding support of conductor loops 50a. FIG. 2 shows a sectional representation through induction charging coil device 10a along the diagonal of square printed circuit board 58a. A contacting unit 32a situated in a corner of induction charging coil device 10a, depicted in the section of FIG. 2, is provided for contacting coil unit 12a with electronics unit 16a, and includes a plug connector 54a soldered to coil unit 12a, and a coupling 56a soldered to electronics unit 16a. Contacting unit 32a is guided through a recess 34a of electronics unit 16a and through a recess 36a of core unit 14a.

Core unit 14a forms a shielding unit 78a and largely shields electronics unit 16a and cell unit 18a from influences of an electromagnetic alternating field from the area of coil unit 12a by focusing the magnetic field lines in the direction of coil unit 12a. Core unit 14a, in the case of a projection in the direction of winding axis 22a of coil unit 12a, has a projection area 20a which covers electronics unit 16a and cell unit 18a, and which corresponds essentially to a projection area 30a of electronics unit 16a and to a projection area 31a of cell unit 18a in the case of a projection in the direction of winding axis 22a. Projecting surface 20a is essentially free of recesses. Recess 36a for feeding through contacting unit 32a includes a surface which corresponds to less than 5% of projection area 20a, and is situated outside a diameter 48a of conductor loops 50a of coil unit 12a which includes windings 52a, so that core unit 14a covers conductor loops 50a free of recesses in the direction of electronics unit 16a and cell unit 18a.

If induction charging coil device 10a is exposed to the influence of an electromagnetic alternating field, a current is induced in conductor loop 50a of coil unit 12a, which may be used to charge cell unit 18a. To generate the electromagnetic alternating field, a second similarly constructed induction charging coil device 10'a is provided, which is situated in an additional hand-held power tool device 40'a designed as a hand-held power tool rechargeable battery charging device 70'a. Induction charging coil device 10'a includes an electronics unit 16'a, which generates an alternating current having a frequency of 100 kHz from a current fed via a power supply 76'a, and feeds it to a coil unit 12'a, so that the electromagnetic alternating field is generated and focused by a core unit 14'a. If hand-held power tool rechargeable battery pack 42a is placed on hand-held power tool rechargeable battery charging device 70'a, induction charging coil device 10a comes under the influence of the electromagnetic alternating field of induction charging coil device 10'a, so that an energy transfer takes place.

The following descriptions and the drawing of additional exemplary embodiments are limited essentially to the differences between the exemplary embodiments, whereby, with regard to similarly identified components, in particular with regard to components having the same reference numerals, reference may in principle also be made to the drawing and/or to the description of the other exemplary embodiments. To differentiate between the exemplary embodiments, the letters b through i, instead of the letter a of the first exemplary embodiment, are placed after the reference numerals of the additional exemplary embodiments.

Figure 3:
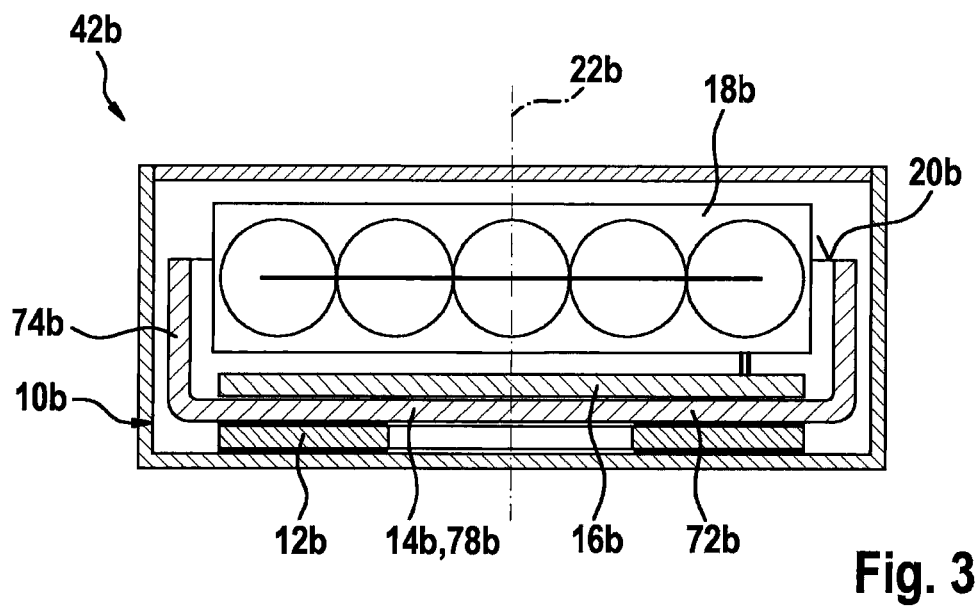

FIG. 3 shows in a second exemplary embodiment a hand-held power tool rechargeable battery pack 42b including an induction charging coil device 10b. Induction charging coil device 10b differs from induction charging coil device 10a of the first exemplary embodiment, in particular, in that a core unit 14b forming a shielding unit 78b has a pot-shaped design and partially surrounds an electronics unit 16b and a cell unit 18b to be shielded. Core unit 14b includes a flat base area 72b, which abuts on a coil unit 12b and, in the case of a projection in the direction of a winding axis 22b of coil unit 12b, completely covers cell unit 18b and electronics unit 16b. A wall area 74b, adjoining base area 72b, extending in the direction of electronics unit 16b, encloses electronics unit 16b and parts of cell unit 18b about winding axis 22b. Pot-shaped core unit 14b is able to particularly effectively shield electronics unit 16b and cell unit 18b from influences of an electromagnetic alternating field from the area of coil unit 12b by focusing magnetic field lines and diverting them in the direction of coil unit 12b.

Figure 4:
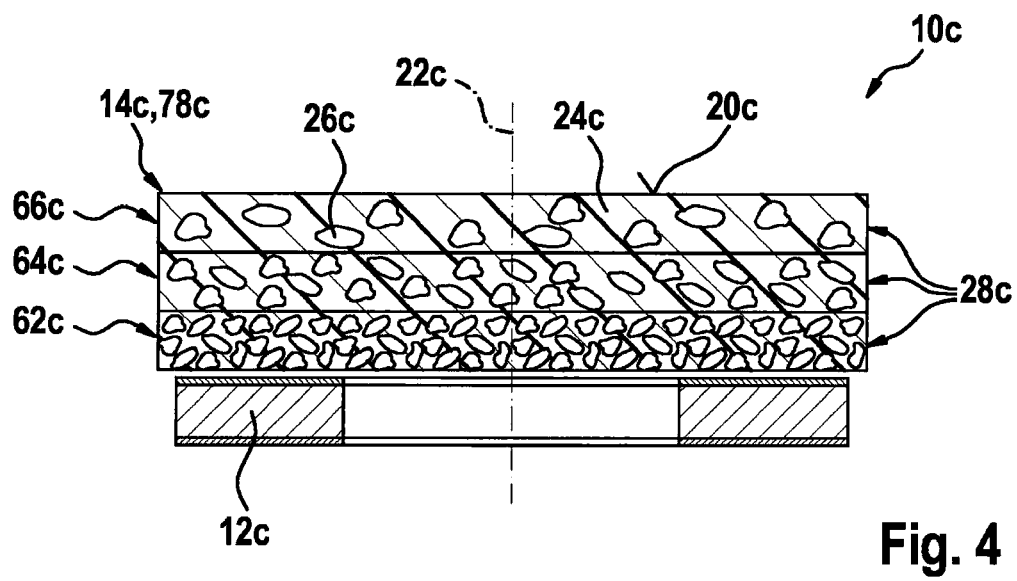

FIG. 4 shows in a third exemplary embodiment a coil unit 12c and a core unit 14c of an induction charging coil device 10c. Induction coil charging device 10c differs from induction charging coil device 10a of the first exemplary embodiment, in particular, in that core unit 14c is formed by core elements 26c embedded in a binding agent 24c. Binding agent 24c is an epoxy resin. Core elements 26c are fragments of a sintered ferrite material. Core unit 14c also includes areas 28c having a differing core material composition. Areas 28c form layers of core unit 14c. First area 28c facing toward coil unit 12c forms an area 62c having a higher density of core elements 26c and has an average relative permeability $\mu=200$. A third area 28c facing away from coil unit 12c forms an area 66c having a lower density of core elements 26c and a high proportion of binding agent 24c, and has an average relative permeability $\mu=20$. A second area 64c situated between areas 62c and 66c has an average density of core elements 26c and an average relative permeability $\mu=50$. During operation of the induction charging coil device, a field strength of the electromagnetic alternating field in core unit 14c rapidly decreases with increasing distance from the side of core unit 14c facing toward coil unit 12c, so that with increasing distance from the side of core unit 14c facing toward core unit 12c, a decreasing proportion of core elements 26c is sufficient. Binding agent 24c exhibits a lower density, lower costs and a higher breaking resistance than core elements 26c, so that the smaller proportion of core elements 26c is advantageous.

Figure 5:
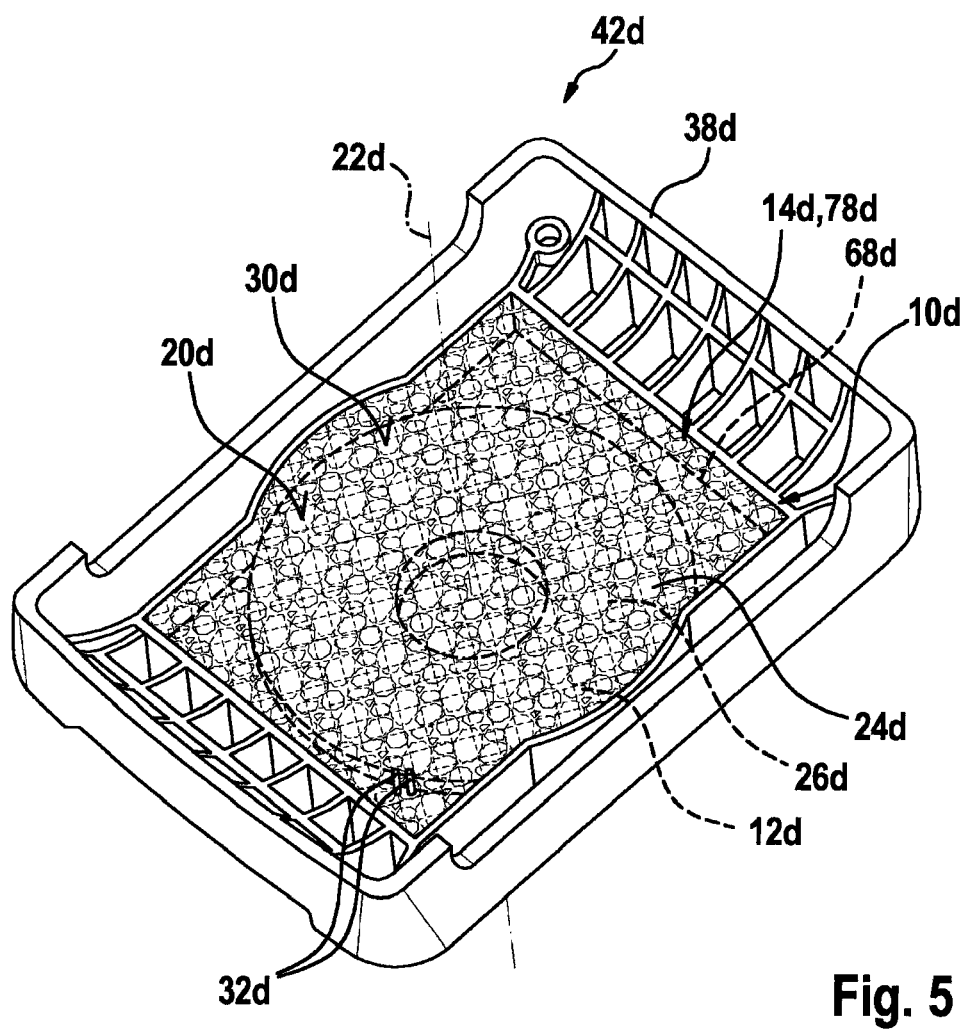

FIG. 5 shows in a fourth exemplary embodiment a coil unit 12d and a core unit 14d of an induction charging coil device 10d. Induction charging coil device 10d differs from induction charging coil device 10c of the third exemplary embodiment, in particular, in that core unit 14d is cast into a housing unit 38d. Housing unit 38d is part of a hand-held power tool rechargeable battery pack 42d not fully depicted herein. Housing unit 38d includes a depression 68d, into which core unit 12d is initially inserted. In a following step, core elements 26d are distributed in the depression. In a following step, coil unit 12d, including core elements 26d, is cast with a binding agent 24d. A contacting unit 32d is connected to coil unit 12d and projects from core unit 14d cast into housing unit 38d, so that coil unit 12d may be connected to charging electronics not further depicted herein and a cell unit of hand-held power tool rechargeable battery pack 42d. Core unit 14d has a projection area 30d in the direction of a winding axis 22d, which completely covers the charging electronics and the cell unit, so that these are effectively shielded from the electromagnetic alternating field from the area of coil unit 12d. Core unit 14d may be advantageously constructed, as shown in the third exemplary embodiment, in multiple layers having a decreasing proportion of core elements 26d by being cast in multiple steps and a different proportion of core elements 26d being added to each layer.

Figure 6:
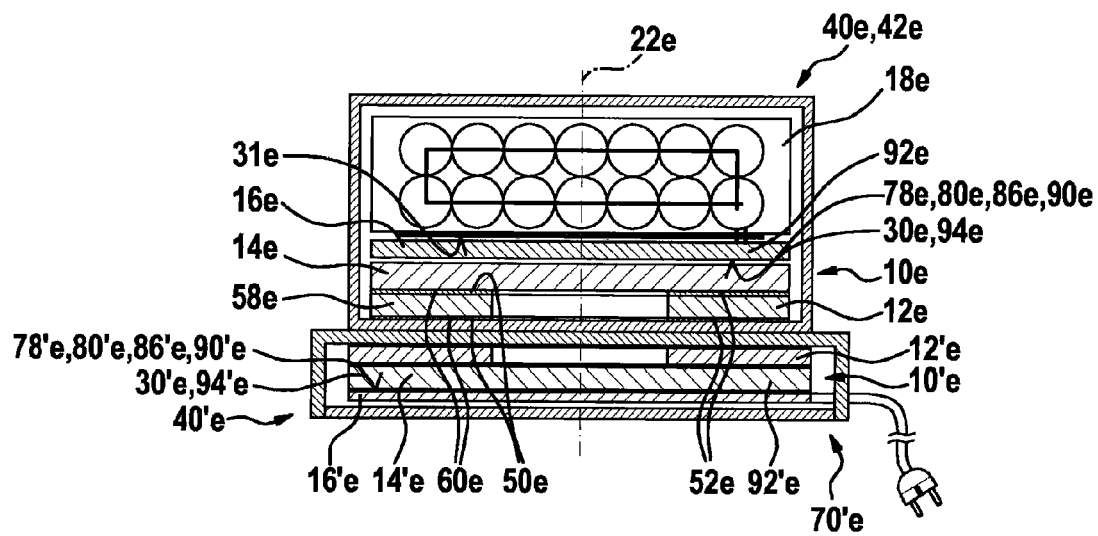

FIG. 6 shows in a fifth exemplary embodiment a handheld power tool device 40e including an induction charging coil device 10e and an additional hand-held power tool device 40'e having an induction charging coil device 10'e. Induction charging coil device 10e differs from induction charging coil device 10a of the first exemplary embodiment, in particular, in that a shielding unit 78e is formed by an electrically conductive material layer 80e. Electrically conductive material layer 80e is situated on a side of electronics unit 16e facing toward a core unit 14e. Material layer 80e, in the case of a projection in the direction of a winding axis 22e of a coil unit 12e, has a projection area 90e, which covers electronics unit 16e and a cell unit 18e. Projection area 90e, in the case of a projection in the direction of winding axis 22e, corresponds essentially to a projection area 31e of cell unit 18e and is identical to projection area 30e of electronics unit 16e. A magnetic alternating field in the area of coil unit 12e is retroreflected in large part by shielding unit 78e in the direction of coil unit 12e, so that a field strength in the area of cell unit 18e, and starting from shielding unit 78e in the direction of the side of electronics unit 16e facing toward cell unit 18e, is reduced. Electronics unit 16e includes a printed circuit board 92e having a conductive layer 94e, which is formed from a copper material. Conductive layer 94e forms material layer 80e and covers the entire side of electronics unit 16e facing toward core unit 14e, so that electronics unit 16e and shielding unit 78e have the same projection areas 30e, 90e.

Figure 7:
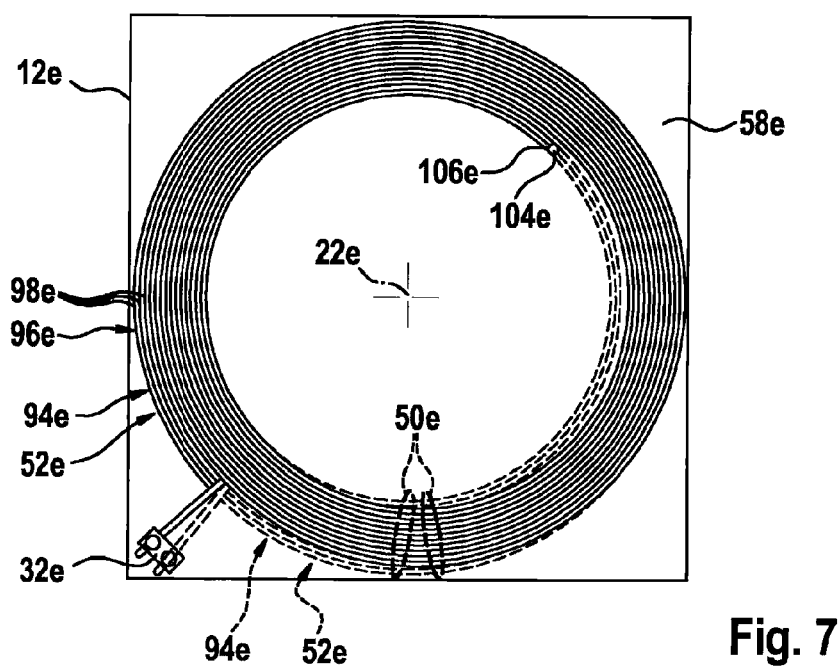

Coil unit 12e (FIG. 7) is formed by an additional printed circuit board 58e having two conductive layers 60e. Coil unit 12e includes two conductor loops 50e having spiral-shaped windings 52e in the same winding direction about winding axis 22e. Windings 52e of conductor loops 50e each include a conductor 96e having three leads 98e situated conductively in parallel to one another, which are formed by conductive layers 60e of printed circuit board 58e. Leads 98e terminate after 4½ windings 52e about winding axis 22e. A connecting lead 106e connected to leads 98e, which is guided through a passage 104e in printed circuit board 58e, connects conductor loops 50e, so that coil unit 12e has in total an uneven number of windings of 9. Because of leads 98e situated conductively in parallel to one another, conductor loops 50e exhibit only minimal eddy current losses when leads 98e are passed through by a high-frequency current.

If induction charging coil device 10e is exposed to the influence of an electromagnetic alternating field, a current is induced in conductor loop 50e of coil unit 12e, which may be used for charging cell unit 18e. To generate the electromagnetic alternating field, the second similarly constructed induction charging coil device 10'e of a hand-held power tool rechargeable battery charging device 70'e is provided. A coil unit 12'e is acted upon by an electronics unit 16'e with an alternating current, so that induction charging coil device 10'e generates the electromagnetic alternating field, which is focused by a core unit 14'e. If a hand-held power tool rechargeable battery pack 42e is placed on a hand-held power tool rechargeable battery charging device 70'e, induction charging coil device 10e comes under the influence of the magnetic alternating field of induction charging coil device 10'e, so that an energy transfer takes place. A shielding unit 78'e, formed by an electrically conductive material layer 80'e, is situated on a side of electronics unit 16'e facing toward core unit 14'e. Material layer 80'e, in the case of a projection in the direction of winding axis 22e of coil 12'e, has a projection area 90'e, which covers electronics unit 16'e. Projection area 90'e, in the case of a projection in the direction of winding axis 22e, corresponds to a projection area 30'e of electronics unit 16'e. A magnetic alternating field in the area of coil unit 12'e is retroreflected in large part by shielding unit 78'e in the direction of coil unit 12'e, so that a field strength, starting from shielding unit 78'e in the direction of a side of electronics unit 16'e facing away from coil unit 12'e, is reduced. Electronics unit 16'e includes a printed circuit board 92'e having a conductive layer 94'a, which is formed from a copper material. Conductive layer 94'e forms material layer 80'e and covers the entire side of electronics unit 16'e facing toward core unit 14'e, so that electronics unit 16'e and shielding unit 78'e have the same projection area 90'e.

Figure 8:
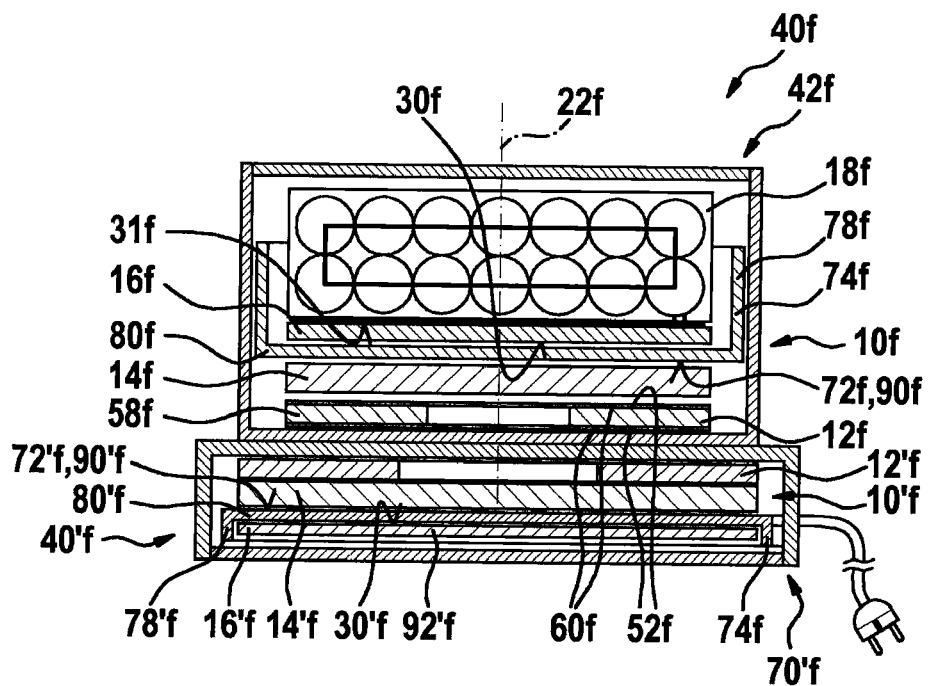

FIG. 8 shows in a sixth exemplary embodiment a coil unit 12f of an induction charging coil device 10f. Induction charging coil device 10f is part of a hand-held power tool device 40f designed as a hand-held power tool rechargeable battery pack 42f. Induction charging coil device 10f differs from induction charging coil device 10e of the fifth exemplary embodiment, in particular, in that a shielding unit 78f is designed as a trough-shaped material layer 80f, and partially surrounds an electronics unit 16f and a cell unit 18f to be shielded. Shielding unit 78f is designed as an aluminum trough having a flat base area 72f which, in the case of a projection in the direction of a winding axis 22f of coil unit 12f, completely covers a core unit 14f. A projection area 90f of shielding unit 78f, in the case of a projection in the direction of winding axis 22f, is larger than projection areas 30f, 31f of electronics unit 16f and cell unit 18f in the case of a projection in the direction of winding axis 22f. A wall area 74f, adjoining base area 72f, extending in the direction of electronics unit 16f, encloses electronics unit 16f and parts of cell unit 18f about winding axis 22f. A contacting unit designed as a plug connector 12f also not depicted herein, which electrically connects electronics unit 16f to coil unit 12f, is also guided through a recess not further depicted herein of shielding unit 78f which, relative to winding axis 22f, is situated outside of windings 52f. Trough-shaped shielding unit 78f is able to particularly effectively shield electronics unit 16f and cell unit 18f from influences of an electromagnetic field from the area of coil unit 12f.

FIG. 8 also shows a coil unit 12'f of an induction charging coil device 10'f of the sixth exemplary embodiment. Induction charging coil device 10'f is part of a hand-held power tool device 40'f designed as a hand-held power tool rechargeable battery charging device 70'f. Induction charging coil device 10'f differs from induction charging coil device 10'e of the fifth exemplary embodiment, in particular, in that a shielding unit 78'f is designed as a trough-shaped material layer 80'f, and partially surrounds an electronics unit 16'f to be shielded having a printed circuit board 92'f. Shielding unit 78'f is designed as an aluminum trough having a flat base area 72'f which, in the case of a projection in the direction of a winding axis 22f of coil unit 12'f, completely covers a core unit 14'f. A projection area 90'f of shielding unit 78'f, in the case of a projection in the direction of winding axis 22f, is larger than a projection area 30'f of electronics unit 16'f in the case of a projection in the direction of winding axis 22f. A wall area 74'f, adjoining base area 72'f, extending in the direction of electronics unit 16′f, encloses electronics unit 16′f about winding axis 22f. A contacting unit designed as a plug connector also not further depicted herein, which electrically connects electronics unit 16′f to coil unit 12′f, is also guided through a recess not further depicted herein of shielding unit 78′f. Trough-shaped shielding unit 78′f is able to particularly effectively shield electronics unit 16′f from influences of an electromagnetic field from the area of coil unit 12′f.

Figure 9:
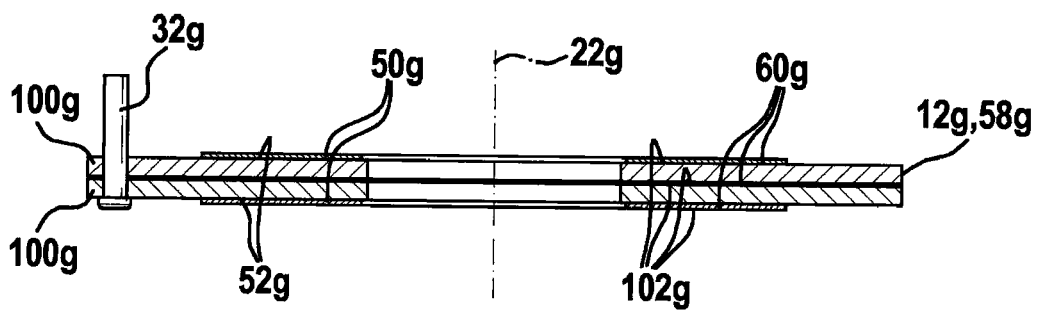

FIG. 9 shows in a seventh exemplary embodiment a coil unit 12g of an induction charging coil device 10g. Induction charging coil device 10g differs from induction charging coil device 10e of the fifth exemplary embodiment, in particular, in that coil unit 12g is formed by a printed circuit board 58g, which has a multilayer structure including two carrier layers 100g. Coil unit 12g includes three conductive layers 60g having conductor loops 50g situated on sides 102g of carrier layers 100g of printed circuit board 58g. Two passages not further depicted herein having connecting leads connect conductor loops 50g. A plug of a contacting unit 32g is provided for contacting coil unit 12g as provided in the preceding exemplary embodiment. Coil unit 12g has a larger number of conductor loops 50g as compared to the preceding exemplary embodiments and, as a result, may include in total a greater number of windings 52g.

Figure 10:
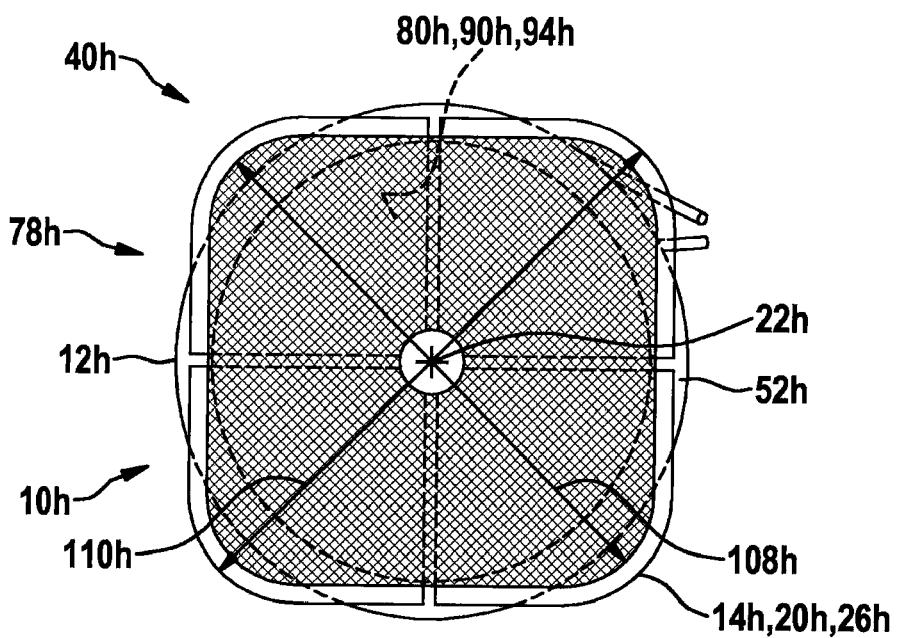

FIG. 10 shows in an eighth exemplary embodiment a shielding unit 78h of a hand-held power tool device 40h having an induction charging coil device 10h including a coil unit 12h. Induction charging coil device 10h differs from induction charging coil device 10e of the fifth exemplary embodiment, in particular, in that an electrically conductive material layer 80h includes a projection area 90h depicted with the aid of a cross-hatching which, in the case of a projection in the direction of a winding axis 22h of coil unit 12h, lies within a projection area 20h of a core unit 14h of induction charging coil device 10h. Core unit 12h includes windings 52h and a winding support not further depicted herein. Windings 52h are designed as windings of a strand wound on the winding support about winding axis 22h. The individual windings are insulated from one another. A maximum outer extent 108 of material layer 80h about winding axis 22h is 3 mm smaller than a maximum outer extent 110h of core unit 14h. Material layer 80h is formed by a conductive layer 94h of a printed circuit board of an electronics unit not further depicted herein. Material layer 80h is situated on a rear side of the printed circuit board facing toward windings 52h, and facing away from a component side. Electronic components not further depicted herein situated on the component side of the printed circuit board are connected with their connecting leads having an identical electric potential to material layer 80h. The connecting leads of the components are in part guided through passages in the printed circuit board and soldered to material layer 80h. Heat arising in the components during operation of induction charging coil device 10h is conducted through the connecting leads to material layer 80h, so that material layer 80h improves a heat dissipation of the components.

Core unit 14h includes multiple core elements 26h. In this case, core unit 14h includes four core elements 26h. Core elements 26h are designed and situated in the form of pizza slices. Projection area 90h of conductive material layer 80h and projection area 20h of a core unit 14h have at least essentially an identical basic shape. Core elements 26h are made up completely of a, in particular, sintered ferrite material, but alternatively could also be made up of fragments of a sintered ferrite material, which are held together by a binding agent.

Core elements 26h are situated relative to one another by the winding support. The winding support is designed as a plastic component. Core elements 26h are situated in gaps of the winding support, which are designed to be open in the direction of conductive layer 94h. The winding support includes separating elements which space core elements 26h apart from one another. The winding support and the printed circuit board secure core elements 26h in a form-locked manner only. Alternatively, the winding support and the printed circuit board could also secure core elements 26h, in particular, in a force fit and/or integral manner.

Core elements 26h are coated with an electrically insulating varnish on a side facing toward material layer 80h. Windings 52h of coil unit 12h enclose core unit 14h on one plane. Core unit 14h on this plane has a circular basic shape.

An electric potential induced by the operation of induction charging coil device 10h in material layer 80h is sufficiently small that the function of the electronic components is not impaired. This is achieved, in particular, as a result of maximum outer extent 108h of material layer 80h being smaller than maximum outer extent 110h of core unit 14h. A field strength of the electromagnetic alternating field is particularly high in the area near maximum outer extent 110h of core unit 14h during operation of induction charging coil device 10h. Material layer 80h is situated outside of this area having a particularly high field strength. A high quality may be achieved during an inductive charging operation, making a precise foreign object detection possible for detecting metallic foreign objects in the magnetic field of coil unit 12h.

Figure 11:
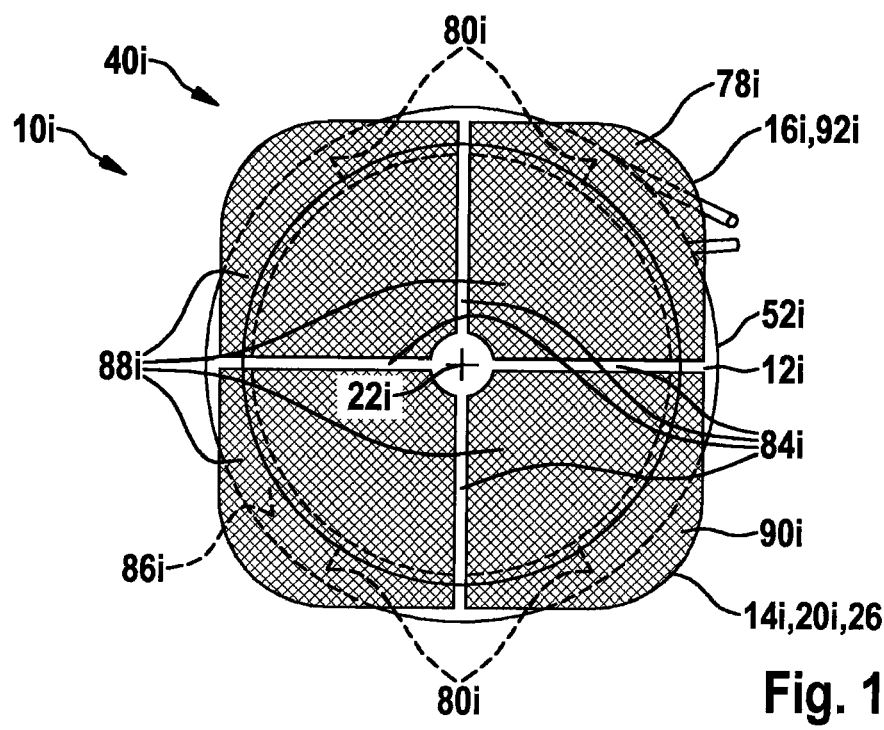

FIG. 11 shows in a ninth exemplary embodiment a shielding unit 78i of a hand-held power tool device 40i, including an induction charging coil device 10i having a coil unit 12i and a core unit 14i. Induction charging coil device 10i differs from induction charging coil device 10e of the fifth exemplary embodiment, in particular, in that four electrically conductive material layers 80i are situated in four quadrants 88i on a rear side 86i facing away from a component side, facing toward windings 52i of coil unit 12i, of a printed circuit board 92i of an electronics unit 16i. Core unit 14i is formed by four core elements 26i designed and situated in the form of pizza slices. Material layers 80i are separated by spaces formed by insulators 84i. Material layers 80i have a shared projection area 90i which, when projecting in the direction of a winding axis 22i, largely covers core unit 14i and coil unit 12i. In one variant of this exemplary embodiment, it is also possible for projection area 90i of material layers 80i, as in the preceding exemplary embodiment, to lie within a projection area 20i of core unit 14i. In this variant, an electric potential induced by the operation of induction charging coil device 10i in material layers 80i is reduced. Material layers 80i are formed by a conductive layer 94i of printed circuit board 92i. Electronic components not further depicted herein, situated on the component side of printed circuit board 92i, are connected with their connecting leads having identical electric potentials to material layers 80i. The connecting leads of the components are guided through passages in printed circuit board 92i and soldered to material layers 80i, in each case identical connecting leads having an electric potential being soldered to one of the four material layers 80i. A potential equalization in the case of connecting leads, which in each case are soldered to one of the other material layers 80i, may be prevented. Heat arising in the components during operation of induction charging coil device 10i is conducted through the connecting leads to the respective material layer 80*i*, so that material layers 80*i* improve a heat dissipation of the components.

What is claimed is:

1. A hand-held power tool rechargeable battery pack, comprising:
    a housing unit;
    at least one electronics unit;
    at least one cell unit; and
    an induction charging coil device, including:
        at least one coil unit;
        at least one shielding unit; and
        at least one core unit;
    wherein the induction charging coil device is situated between the cell unit and a housing wall of the housing unit and the electronics unit is situated between the cell unit and the induction charging coil device,
    wherein a projection area of the core unit, in an operating state in which a projection is in a direction of a winding axis of the coil unit, covers at least essentially the at least one of the at least one electronics unit and the one cell unit to shield the at least one of the at least one electronics unit and the one cell unit.

2. The hand-held power tool rechargeable battery pack as recited in claim 1, wherein the induction charging coil device is a hand-held power tool induction charging coil device.

3. The hand-held power tool rechargeable battery pack as recited in claim 1, wherein the shielding unit is formed at least partially by the core unit.

4. The hand-held power tool rechargeable battery pack as recited in claim 1, wherein the projection area of the core unit is at least essentially free of recesses.

5. The hand-held power tool rechargeable battery pack as recited in claim 1, wherein the shielding unit is formed at least partially by at least one electrically conductive material layer.

6. The hand-held power tool rechargeable battery pack as recited in claim 5, wherein the at least one electrically conductive material layer has a projection area which, in an operating state in which the projection is in the direction of the winding axis of the coil unit, covers at least essentially the at least one of the at least one electronics unit and the one cell unit to shield the at least one of the at least one electronics unit and the one cell unit.

7. The hand-held power tool rechargeable battery pack as recited in claim 5, wherein the at least one electrically conductive material layer has a projection area that, in an operating state in which the projection is in the direction of the winding axis of the coil unit, lies at least essentially within the projection area of the core unit.

8. The hand-held power tool rechargeable battery pack as recited in claim 5, wherein the shielding unit has a plurality of electrically conductive material layers separated from one another by insulators in the projection area in the direction of the winding axis of the coil unit.

9. The hand-held power tool rechargeable battery pack as recited in claim 5, wherein at least one electrically conductive material layer is situated on a rear side of the electronics unit.

10. The hand-held power tool rechargeable battery pack as recited in claim 1, wherein at least one of the projection area of the core unit and at least one projection area of an electrically conductive material layer, in an operating state in which the projection is in the direction of the winding axis corresponds at least essentially to a projection area of the at least one of the at least one electronics unit and the one cell unit to shield the at least one of the at least one electronics unit and the one cell unit, in an operating state in which the projection is in the direction of the winding axis.

11. The hand-held power tool rechargeable battery pack as recited in claim 1, wherein at least one of the core unit and at least one electrically conductive material layer has an at least partially pot-shaped design.

12. The hand-held power tool rechargeable battery pack as recited in claim 5, wherein at least one of the core unit and the at least one electrically conductive material layer at least partially surround at least one of the electronics unit and the cell unit to shield the at least one of the at least one electronics unit and the one cell unit.

13. The hand-held power tool rechargeable battery pack as recited in claim 1, further comprising a contacting unit guided through a recess of at least one of the electronics unit and the cell unit.

* * * * *